(12) United States Patent
Armstrong et al.

(10) Patent No.: US 8,990,764 B2
(45) Date of Patent: Mar. 24, 2015

(54) AUTOMATED ANALYSIS OF CODE DEVELOPER'S PROFILE

(75) Inventors: Andrew Alan Armstrong, Chandlers Ford (GB); Christopher Phillips, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 13/463,252

(22) Filed: May 3, 2012

(65) Prior Publication Data

US 2012/0216172 A1 Aug. 23, 2012

Related U.S. Application Data

(63) Continuation of application No. 13/204,679, filed on Aug. 6, 2011.

(30) Foreign Application Priority Data

Aug. 6, 2010 (EP) ..................................... 10172123

(51) Int. Cl.
*G06F 9/44* (2006.01)
*G06F 3/00* (2006.01)
*G06Q 10/10* (2012.01)

(52) U.S. Cl.
CPC .. *G06F 8/30* (2013.01); *G06F 8/71* (2013.01); *G06Q 10/109* (2013.01)
USPC ........... 717/101; 717/100; 717/102; 717/120; 719/318

(58) Field of Classification Search
CPC ..................................... G06F 8/20; G06F 8/71
See application file for complete search history.

(56) References Cited

U.S. PATENT DOCUMENTS

| | | | | |
|---|---|---|---|---|
| 5,671,415 | A * | 9/1997 | Hossain ........................ | 717/101 |
| 7,234,131 | B1 * | 6/2007 | Speyrer et al. ................ | 717/101 |
| 8,146,100 | B2 * | 3/2012 | Kilian-Kehr .................. | 719/318 |
| 8,561,012 | B1 * | 10/2013 | Holler et al. .................. | 717/102 |
| 8,572,560 | B2 * | 10/2013 | Drissi et al. ................... | 717/120 |
| 8,589,880 | B2 * | 11/2013 | Jones et al. ................... | 717/124 |
| 8,656,343 | B2 * | 2/2014 | Fox et al. ...................... | 717/101 |
| 2002/0026629 | A1 * | 2/2002 | Utsumi ........................ | 717/101 |
| 2003/0123889 | A1 * | 7/2003 | Isobe et al. ...................... | 399/27 |
| 2007/0220479 | A1 * | 9/2007 | Hughes ........................... | 717/100 |
| 2007/0250816 | A1 * | 10/2007 | Rose .............................. | 717/124 |
| 2007/0288884 | A1 | 12/2007 | Brunssen et al. | |
| 2008/0046860 | A1 | 2/2008 | Kratschmer et al. | |

(Continued)

OTHER PUBLICATIONS

K. Nakakoji, Y. Ye et al. "Supporting Expertise Communication in Developer-Centered Collaborative Software Development Environments", [Online], Springer May 2010, pp. 1-20, [Retrieved from Internet on Jul. 29, 2014], <http://www.kidresearch.jp/publications/cose-Chap11-NYY-rev-wt-header.pdf>.*

(Continued)

*Primary Examiner* — Thuy Dao
*Assistant Examiner* — Ziaul A Chowdhury
(74) *Attorney, Agent, or Firm* — Thomas E. Lees, LLC (57) ABSTRACT

The automated analysis of a code developer's profile comprises gathering data relating to code repository updates by a developer, analyzing the gathered data to determine profile attributes of the developer to provide a behavior analysis of the developer and analyzing, using a microprocessor, the profile attributes of the developer with respect to role descriptions.

5 Claims, 5 Drawing Sheets

(56) References Cited

U.S. PATENT DOCUMENTS

| | | | |
|---|---|---|---|
| 2008/0155508 A1 | 6/2008 | Sarkar et al. | |
| 2008/0320436 A1* | 12/2008 | Hughes | 717/100 |
| 2009/0070734 A1 | 3/2009 | Dixon et al. | |
| 2009/0113381 A1 | 4/2009 | Chancey et al. | |
| 2009/0113382 A1 | 4/2009 | Chancey et al. | |
| 2009/0138843 A1* | 5/2009 | Hinton et al. | 717/101 |
| 2009/0276752 A1* | 11/2009 | Sharma | 717/103 |
| 2011/0055799 A1* | 3/2011 | Kaulgud et al. | 717/101 |
| 2011/0252394 A1* | 10/2011 | Sharma et al. | 717/101 |
| 2012/0117531 A1* | 5/2012 | Rosenbaum et al. | 717/100 |

OTHER PUBLICATIONS

Roger S. Pressman, "Software Engineering: A Practitioner's Approach" [Online], Mc Graw Hill 2009, pp. 1-21, [Retrieved from Interent on Jul. 29, 2014], <http://academic.brooklyn.cuny.edu/cis/sfleisher/Chapter_03_sim.pdf>.*

VenuGopal Balijepally et al. "Assessing Personality Profiles of Software Developers in Agile Development Teams", [Online], 2006, pp. 55-75, [Retrived from Internet on Nov. 2, 2014], <http://aisel.aisnet.org/cgi/viewcontent.cgi?article=3075&context=cais>.*

Thomas D. LaToza et al., "Maintaining Mental Models: A Study of Developer Work Habits", [Online], ACM 2006, pp. 492-501, [Retrieved from Internet on Nov. 2, 2014],<http://plg.math.uwaterloo.ca/~migod/846/papers/icse06-venolia.pdfhttp://plg.math.uwaterloo.ca/~migod/846/papers/icse06-venolia.pdf>.*

Andrew Begel et al., " Novice Software Developers, All Over Again", [Online], ACM 2008, pp. 1-12, [Retrieved from Internet on Nov. 2, 2014], <http://research.microsoft.com/en-us/um/people/abegel/papers/icer-bege1-2008.pdf>.*

K. Nakakoji et al., "Supporting Expertise Communication in Developer-Centered Collaborative Software Development Environments", [Online], 2010, pp. 1-20, [Retrieved from Internet on Nov. 2, 2014], <http://www.kidresearch.jp/publications/cose-Chap11-NYY-rev-wt-header.pdf>.*

Chowdhury, Ziaul A., Office Action dated Sep. 10, 2013 for U.S. Appl. No. 13/204,679, Andrew Alan Armstrong et al., "Automated Analysis of Code Developer's Profile", filed Aug. 6, 2011.

IBM; "Visualized Development Tool for Building Coding-Phase Collaborations in Virtual World", ip.com, Prior Art Database, IPCOM000191336D, Dec. 30, 2009.

Chowdhury, Ziaul A., Office Action dated Apr. 2, 2014 for U.S. Appl. No. 13/204,679, Andrew Alan Armstrong et al., "Automated Analysis of Code Developer's Profile", filed Aug. 6, 2011.

Chowdhury, Ziaul A., Office Action dated Sep. 8, 2014 for U.S. Appl. No. 13/204,679, Andrew Alan Armstrong et al., "Automated Analysis of Code Developer's Profile", filed Aug. 6, 2011.

* cited by examiner

AUTOMATED ANALYSIS OF CODE DEVELOPER'S PROFILE

CROSS-REFERENCE TO RELATED APPLICATIONS

This application is a continuation of U.S. patent application Ser. No. 13/204,679, filed Aug. 6, 2011, entitled "AUTOMATED ANALYSIS OF CODE DEVELOPER'S PROFILE", which claims priority to European Patent Application No. 10172123.1, filed Aug. 6, 2010, the disclosures of which are incorporated herein by reference.

BACKGROUND

Various aspects of the present invention relate to the field of analysis of code repositories. In particular, aspects of the invention relate to analysis of code repository entries by individual developers.

Managers and team leaders in the field of computer code development often have little understanding of their development team's coding habits and profiles. Developers work in various different ways and a certain developer's habits may or may not be suitable for the specific project that the certain developer is working on. Accordingly, trying to determine how a member of a team fits in with the chosen development methodology can be difficult.

A developer that is not suited to a specific development style and role can lead to wasted time, lower productivity and inefficient processes. Therefore, a person in a position of management looks for a developer who best fits with the current development team and whose style of work would easily merge and contribute positively to a project. A manager must also ensure current team members are working to the best of their abilities and working alongside the other team members. As such, a goal of management is to ensure the developers are in the correct role, and that there is the correct mix of people within a team to make it balanced and successful.

BRIEF SUMMARY

According to aspects of the present invention, an automated analysis of a code developer's profile comprises gathering data relating to code repository updates by a developer and analyzing the gathered data to determine profile attributes of the developer to provide a behavior analysis of the developer. The automated analysis also comprises analyzing the profile attributes of the developer with respect to role descriptions. The automated analysis may be implemented, for instance, as a method or as a computer-readable storage medium with an executable program stored thereon, wherein the program instructs a microprocessor to perform the above recitations. Moreover, according to further aspects of the present invention, the automated analysis of a code developer's profile may be implemented to provide a service to a customer over a network.

BRIEF DESCRIPTION OF THE SEVERAL VIEWS OF THE DRAWINGS

Aspects of the invention may best be understood by reference to the following detailed description when read with the accompanying drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A method, computer program product and system are described for the automated analysis of code repository information to analyze code developers' behavior to generate profiles. Analysis is carried out of discrete numerical and textual information which is already collected and stored in code repositories. A code repository centrally stores code that the development team works on. The code repository also tracks discrete information for its own records when each user adds their changes. This concept has widespread use by small and major development teams.

When a developer commits his or her work to a central repository, information for audit and general repository core processes (such as being able to back track to a previous version of code), is collected. Examples of such data include: the comment a developer entered for his changes, the time that the code was submitted, the number of lines which have been changed, and the specific changes themselves.

Using this data, an extension to a code repository is distributed, which allows the automated analysis of this discrete data to derive meaningful information over a period of time about a specific developer.

This analysis is then used to gain insightful information on the profile of an individual developer. For example, a profile may use information on a developer's behavior and habits, working hours, nature of commit comments, number of times a developer commits per day, how any conflicting changes made by multiple developers on a team were resolved, determining how the developer resolves team problems, etc.

After collection of such data, the output of the analysis details a profile analysis including, in particular, a relevant role or characteristic of a role within a team, which would be suitable for the developer. For example, based upon the profile statistics, a developer may suit a particular form of development process environment.

Figure 1:
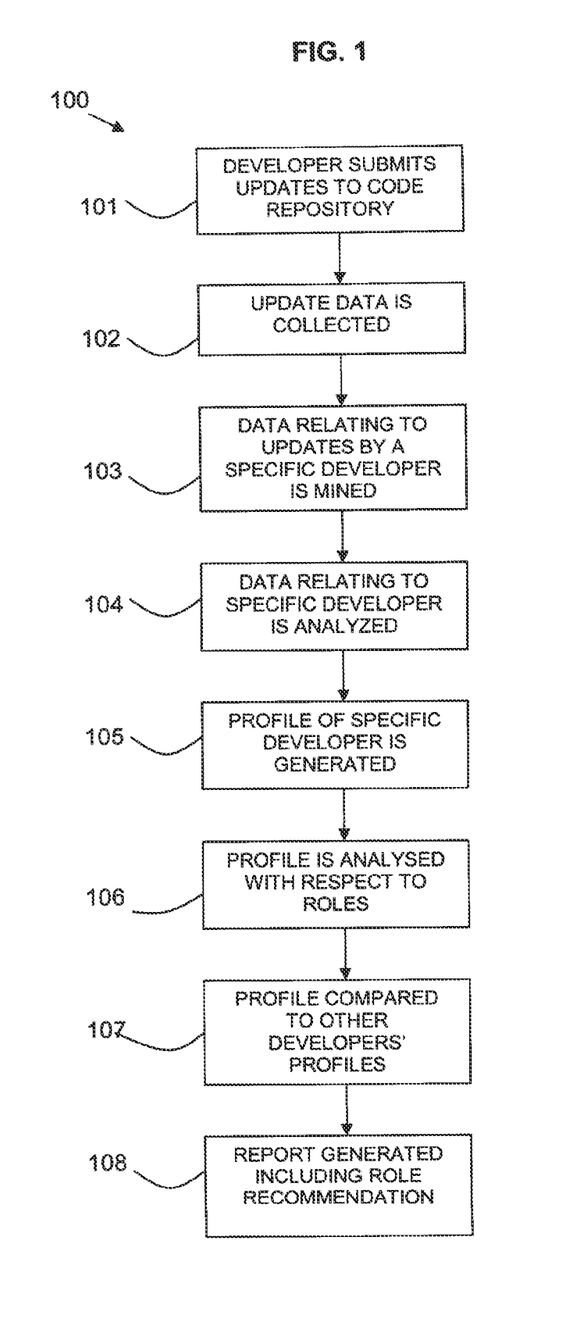
FIG. 1 is a flow diagram for implementing an automated analysis, in accordance with aspects of the present invention.

Referring to FIG. 1, a flow diagram 100 shows a general approach for the automated code analysis of a developer. A developer submits 101 updates to a code repository. Update data is collected 102, and data relating to updates by a specific developer is mined 103.

The gathered data relating to a specific developer is analyzed 104 for a given period of time or for a number of committed updates from the developer.

A profile of the specific developer is generated 105 and analyzed 106 with respect to role characteristics or role descriptions. Moreover, the profile may be compared 107 to other developer's profiles. A report is generated 108 including recommendations for one or more of a developer's role, a developer's profile style, a developer's compatibility with other developers, a developer's efficiency, etc. The report may be generated for multiple developers, for example, to assess a team of developers' efficiency.

Figure 2:
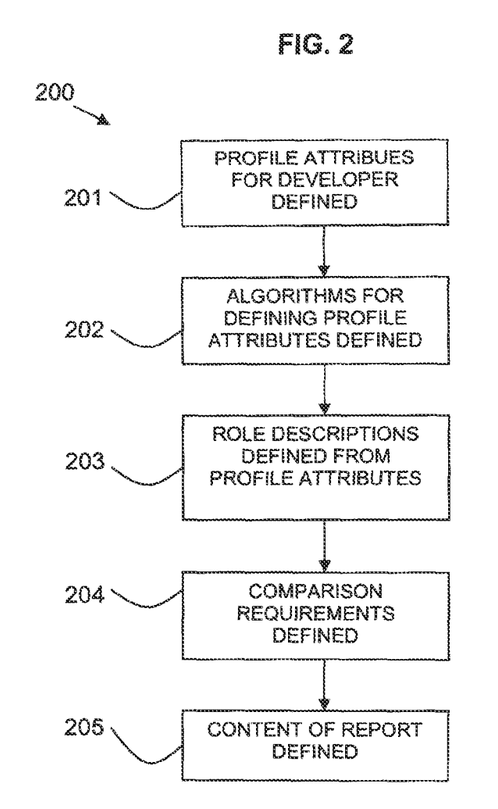
FIG. 2 is a flow diagram defining a set up of an automated analysis, in accordance with aspects of the present invention.

Referring to FIG. 2, a flow diagram 200 shows the input definitions for the automated analysis method. The input definitions may be tailored by the developers' management to obtain the required analysis.

Profile attributes of a developer are defined 201. For example, profile attributes may include: the size of the code change made, the percentage of conflicting changes made, an update commit frequency, the range of working hours, the regularity of events, the nature of comments on updates, etc.

Algorithms for defining profile attributes are defined 202. For example, for a size of code change attribute, a determination may be made as to how many blocks of code have changed. As another example, for an update commit frequency, a determination may be made as to the time since the last commit and this may be added to a running average frequency of commits.

Role descriptions are defined 203 from the profile attributes of a developer. Role descriptions can use profile attributes to determine a developers aptitude for a given role description. As an example, a role description may be an "agile" role requiring a high commit regularity of small changes, with small depth of comments, flexible working hours. As another example, a role description may be an "iterative" role requiring a low commit regularity with deep comment and high magnitude of changes.

Comparison requirements are defined 204 to define parameters requiring comparison between developers.

Content of a report is defined 205 to enable a manger to obtain the information required by him. A report can contain the raw data of the profile attributes, the assessment of some profile attributes, the role descriptions the developer has aptitude for, comparisons with other developers, etc. A report can be generated for a single developer or a group of developers.

Figure 3:
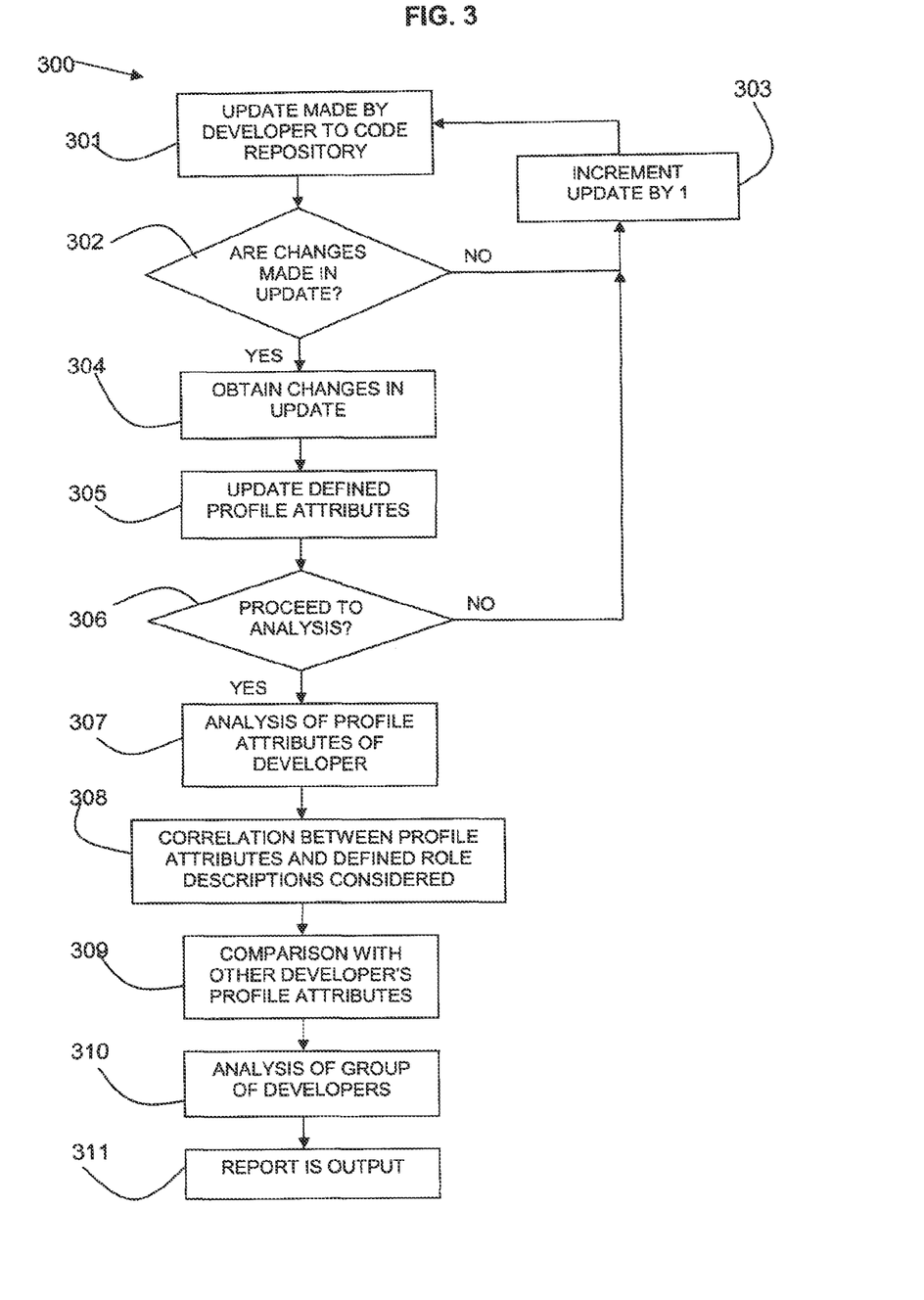
FIG. 3 is a flow diagram of an example embodiment of an automated analysis, in accordance with aspects of the present invention.

Referring to FIG. 3, a flow diagram 300 shows an embodiment of a more detailed method of automated analysis.

An update is made 301 to a code repository by a developer. A determination is made 302 as to whether changes are made in the update. If no changes are made, the update count is incremented 303 by 1 and the next update is awaited. If changes are made, the changes in the update are obtained 304. Defined profile attributes are updated 305 using the defined profile attribute algorithms.

If analysis is carried out after each update or if a predetermined number of updates have taken place or a time period elapsed, the method proceeds 306 to the analysis step. If not, the update count is incremented by 1 and the method loops to await further updates 301.

Analysis of the profile attributes of a developer is carried out 307. Correlation between profile attributes and a defined role description is considered 308. Comparison with other developer's profile attributes may optionally be carried out 309. Analysis of a group of developers may be optionally carried out 310.

A report is output 311 including one or more of profile attributes, derived statistics, described role suitability, etc. The report may be generated for one or a group of developers.

According to further aspects of the present invention, a system for automated analysis of a code developer's profile comprises a central code repository for receiving code repository updates from multiple developers and a microprocessor coupled to a memory. The microprocessor is programmed to evaluate search results by implementing a data collector for collecting data on code repository updates and a developer analysis component. The developer analysis component includes a data gathering component for gathering data relating to code repository updates by a developer, a profile attribute updater component for determining profile attributes of the developer and a correlation component to analyze profile attributes of the developer with respect to role descriptions.

Figure 4:
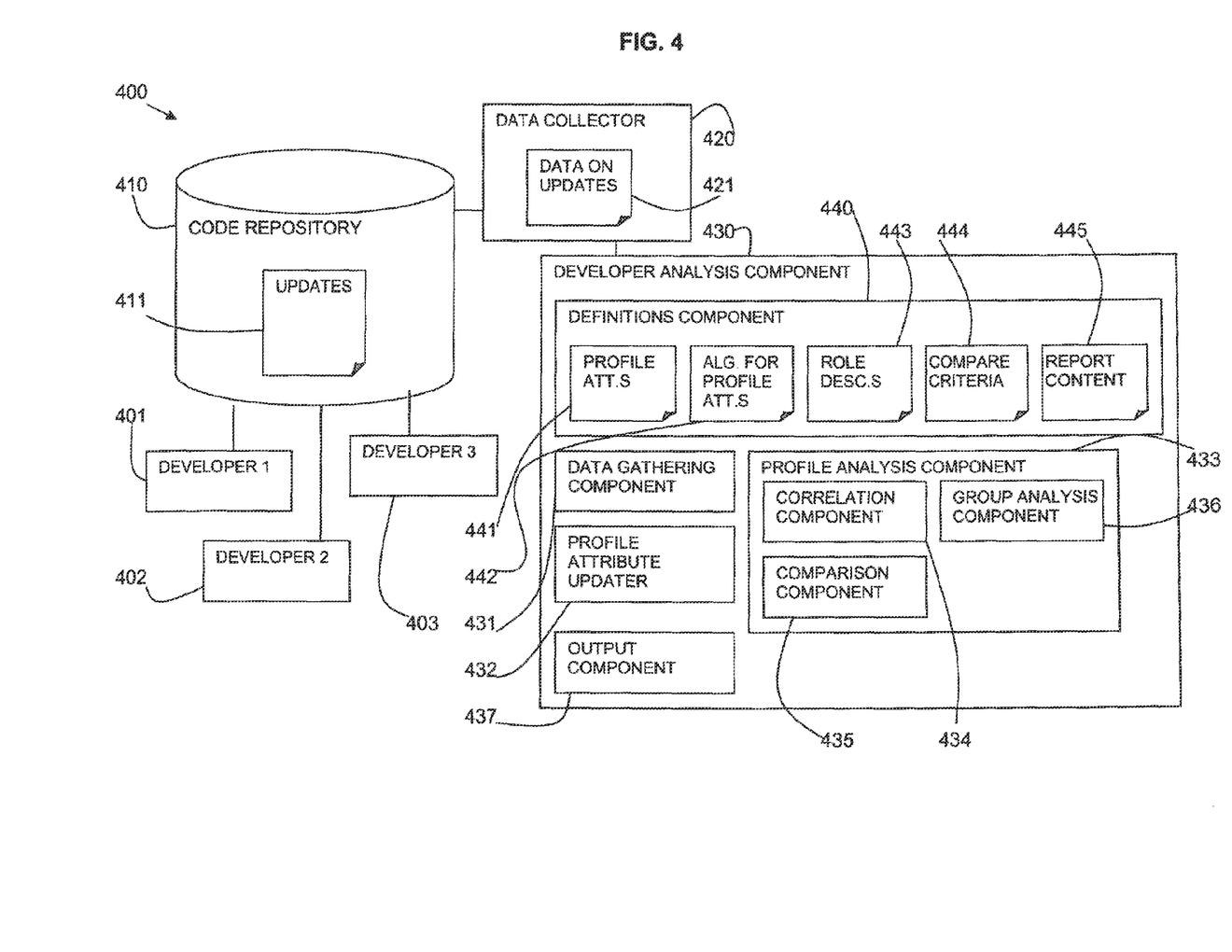
FIG. 4 is a block diagram of a system for implementing an automated analysis, in accordance with aspects of the present invention.

Referring to FIG. 4, a block diagram shows a system 400 for automated code analysis of a developer.

A central code repository 410 is provided which stores code updates 411 generated by one or more developers 401-403. Developers 401-403 commit their work as updates 411 to the central code repository 410.

A data collector 420 mines and collects data 421 on the updates 411. This data 421 is generally used for audits and repository core processes. The data 421 may include comments by a developer 401-403 for his update 411, the time of submission of the update 411, the number of lines of code changed in the update 411, and the specific changes to the code made in the update 411.

The described system 400 includes a developer analysis component 430. This may be provided as an extension to the code repository 410 or to the data collector 420.

The developer analysis component 430 includes a definitions component 440 in which a manager can define required definitions for the analysis. The definitions component 440 includes an input for definitions of profile attributes 441, algorithms for the profile attributes 442, role descriptions 443, comparison criteria 444, and report content 445.

The developer analysis component 430 further includes a data gathering component 431 for gathering data relating to a developer 401-403 after each update by the developer to the central code repository 410 or after a given number of updates, or over a given time period. A profile attribute updater 432 updates the profile attributes 441 for a developer using the defined profile attribute algorithms 442.

A profile analysis component 433 analyzes the profile attributes for the developer 401-403 to determine the behavior of the developer. The data analysis component 433 includes a correlation component 434 fitting profile attributes of a developer 401-403 to defined role descriptions 443. The data analysis component 433 may also include a comparison component 435 for comparing analyzed profile attributes of more than one developer 401-403. The data analysis component 433 may also include a group analysis component 436 for analyzing a group of developers 401-403, for example that form a team.

An output component 437 outputs a report relating to suitable roles, profiles, key attributes, generalizations of techniques or habits, etc. The report may be for a single developer 401-403 or multiple developers 401-403.

Figure 5:
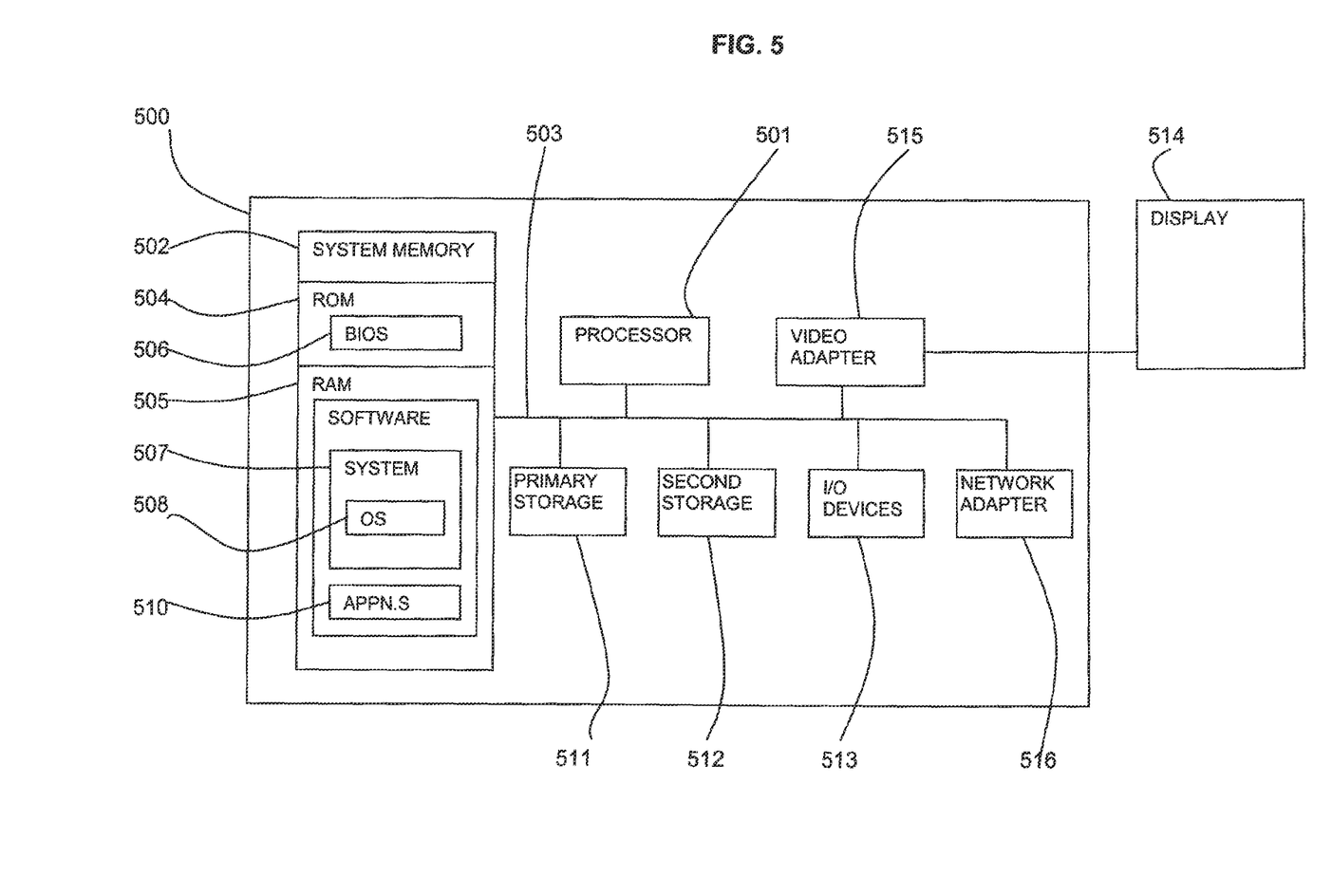
FIG. 5 is a block diagram of a computer system in which aspects of the present invention may be implemented.

Referring to FIG. 5, an exemplary system for implementing aspects of the invention includes a data processing system 500 suitable for storing and/or executing program code including at least one processor 501 coupled directly or indirectly to memory elements through a bus system 503. The memory elements can include local memory employed during actual execution of the program code, bulk storage, and cache memories which provide temporary storage of at least some program code in order to reduce the number of times code must be retrieved from bulk storage during execution.

The memory elements may include system memory 502 in the form of read only memory (ROM) 504 and random access memory (RAM) 505. A basic input/output system (BIOS) 506 may be stored in ROM 504. System software 507 may be stored in RAM 505 including operating system software 508. Software applications 510 may also be stored in RAM 505.

The system 500 may also include primary storage 511 such as a magnetic hard disk drive and secondary storage 512 such as a magnetic disc drive and an optical disc drive. The drives and their associated computer-readable media provide non-volatile storage of computer-executable instructions, data structures, program modules and other data for the system 500. Software applications may be stored on the primary and secondary storage 511, 512 as well as the system memory 502.

The computing system 500 may operate in a networked environment using logical connections to one or more remote computers via a network adapter 516.

Input/output devices 513 can be coupled to the system either directly or through intervening I/O controllers. A user may enter commands and information into the system 500 through input devices such as a keyboard, pointing device, or other input devices (for example, microphone, joy stick, game pad, satellite dish, scanner, or the like). Output devices may include speakers, printers, etc. A display device 514 is also connected to system bus 503 via an interface, such as video adapter 515.

An example embodiment for automated analysis of a developer over a given time period is described.

A developer's profile attributes may be defined as including:
- profile_ChangeMagnitude—A value which concludes the amount on average changed by a developer per commit where the lower the value—the higher the amount is changed.
- profile_ConflictRegularity—A value as a percentage of the number of commits which had a conflict which has been resolved by the user.
- profile_CommitFrequency—An average value in days, hours, minutes, seconds stating how frequently the user commits changes to the repository.
- profile_RangeWorkingHours—A map between the hour of day a user commits and the number of times this has occurred.
- profile_EventRegularity—A value which states the regularity of events between a user and a repository where the higher the number, the higher the regularity.
- profile_CommentRegularity—A value as a percentage of the frequency the user commits with a comment attached.
- profile_CommentDepth—A value stating the depth and associated detail within commit comments decided as one of a set of possible depths, shallow, mid-range or deep.
- profile_ConclusionReport—A conclusion report which can be constructed for each commit or repository interaction or less often on demand by management. The profile_ConclusionReport attribute contains the raw details of the profile and automated analysis. It also contains possible comparison between this profile and other users who have profiles on the repository. It is in this field where the step of concluding if a development role is suitable for a person is calculated and displayed.

If a change has occurred in an update to the code, the following algorithms are carried out with reference to the profile attributes above:

---

Determine how many blocks of code have changed.
Determine the number of lines per block.
Determine the average magnitude of change per block(*1).
Add new z value to running average of profile_ChangeMagnitude value.
Determine if a conflict occurred during the commit.
Determine if this was resolved (*2).
Update value of profile_ConflictRegularity with s.
Determine time of commit.
Determine time since last commit and commit frequency (*3).
Add new c value to running average of profile_CommitFrequency value.
Increment profile_RangeWorkingHours map entry for this hour of work by 1.
Determine regularity of repository interaction (*4).
Replace profile_EventRegularity value with g.
Determine if a comment was entered.
Determine details about the comment (*5).
Add new 1 value to profile_CommentRegularity field.
Increment profile_CommentDepth map entry for result of o.
Determine conclusion report for user profile (*6).
Otherwise:
Increase profile_updates +1
(*1):
$x$ = The number of characters which changed per line on average as a percentage.
$y$ = The number of blocks which had changes in them.
$z$ = The magnitude of change value y/x (The lower the value the larger the magnitude of change).
(*2):
$q$ = Total number of commits made to repository.
$r$ = Commits made to repository with a conflict which was resolved.
$s$ = % of commits solved by user q/r * 100.
(*3):
$a$ = Time of commit.
$b$ = Time of previous commit.
$c$ = Time since last commit a − b.
(*4):
$d$ = Number of repository interactions in past + 1.
$e$ = Age of the user profile.
$f$ = Average number of interactions per day.
$g = d/e * f$
(*5):
$h$ = length of comment as number of characters.
$I$ = number of new line characters.
$j$ = The total number of commits to the repository.
$k$ = The total number of commits with comments.
$l$ = % of commits with comments j/k * 100.
$m$ = Depth of comment h /i * 1.
$o$ = Assess m against a management decided set of benchmarks for depth of comments - shallow, mid range, deep.
(*6):
Output all raw fields of updated user profile to a report.
In addition, analyzed fields are added to the report.

---

The report may include the following analysis:
Determine hours worked per week by assessment of user profile fields.
Determine working with others value by interpreting the profile_ConflictRegularity field. This is dependant upon the project and is open to configuration. One example is that the profile_ConflictRegularity field could be interpreted such that a high value for this field could mean the person is working on a central part of the project. Insert this result to the report.
Determine any other valid statistical comparison between this user profile and other user profiles to find the standard deviation of a profile from the mean profile values. This finds users who may be at the extreme side of the average who may need to be highlighted for support or acclaim. Insert this result to the report.

The main addition to the report is the assessment of the various profile attributes to determine the most appropriate and applicable development role that would suit the developer. For instance, if the user had a high commit regularity of small changes, with small depth of comments, and flexible working hours then the automated analysis of these results may produce that the developer would suit an "agile" development environment. Other possible results are shown below; however, these are open to interpretation and could easily be altered to appropriate values by a suitable administrator.

Commit regularity is >=3 times per day with a change magnitude value above a value determined from other iterative projects, thus meaning smaller sized commits. Other values can be included in the analysis such as low values for comment regularity and comment depth being shallow—this set of results would produce a result stating the user may be more suitable to an agile development environment.

The opposite scenario may be suggestive of an iterative project with low commit regularity in comparison to the average profiles which state the development role of "agile". However it would be expected that each commit be followed with a lengthy deep comment and the magnitude of changes to be high as they are committing less often—and thus defining an "iterative" suited developer.

The above definitions are certain interpretations of a view of how development styles can be defines such as "agile" and "iterative" development styles. This could easily be modified to suit any other interpretation or coding methodology.

Other additions to this report could easily be developed under a management's interpretation of the profile attributes.

In conclusion, a method, computer program product and system are described for assessing the habits and understanding a developer's coding style and general day to day cycle that automates the process of estimating the relevant role of development this developer would suit. This contributes to any assessment of a member of a coding team's suitability to a project and the current efforts of team members already in place. For instance, a determination can be made as to whether a developer is suited to a specific development style and role in a specific project. This could lead to teams becoming more efficient, productive and delivering faster with better code. It could also lead to happier developers working on more appropriate projects.

The approaches described more fully herein, avoid wasted time with ineffective developers, thus increasing productivity and efficiency of processes. The approaches described more fully herein, may also result in building a balanced, accurate understanding of developer(s). The approaches set out more fully herein also avoid the problems of having to rely upon assessing a person for their suitability to a development methodology solely by interview, appraisal or study of their previous work, which is a very time consuming process for management to undertake. For instance, there may be many candidates to evaluate and such manual processes can result in a heavy burden on time, accuracy of results and money.

The described method and system provide a number of advantages over existing assessment techniques. As an example, a small agile development team may require frequent synchronization between developers and the central repository, and not require change commentary for code submissions. The user profile for a possible addition to the team could be studied and very quickly a conclusion could be drawn about the specific person's coding style and whether it suits the current team and the team's requirements. This conclusion is based upon the described algorithms and study of the appropriate data.

In addition, current team members' contributions could be assessed by management to determine where modifications to the development process could be made to increase efficiency or productivity and to help create solutions to problems within the development process.

An automated analysis system for code developers may be provided as a service to a customer over a network.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

As will be appreciated by one skilled in the art, aspects of the present invention may be embodied as a system, method or computer program product. Accordingly, aspects of the present invention may take the form of a computer program product accessible from a computer-usable or computer-readable medium (or mediums) providing program code for use by or in connection with a computer or any instruction execution system. Any combination of one or more computer readable medium(s) may be utilized. The computer readable medium may be a computer readable signal medium or a computer readable storage medium. A a computer readable storage medium can be, for example, but not limited to, an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Improvements and modifications can be made to the foregoing without departing from the scope of the present invention.

What is claimed is:

1. A method for automated analysis of a code developer's profile, comprising:
    defining a plurality of development process environment types including at least a select one of iterative environment and agile environment;
    gathering data relating to code repository updates by a developer;
    analyzing the gathered data to determine profile attributes of the developer to provide a behavior analysis of the developer;
    analyzing, using a microprocessor, the profile attributes of the developer with respect to role descriptions;
    classifying, using the microprocessor, the developer based on the profile attributes and at least one of the defined development process environment types; and
    providing a report including recommendations for the developer, based at least in part upon the analysis of the profile attributes and at least four of: raw fields of updated profile attributes, hours worked, analysis of working with other developers, comparison to other developers, applicable roles, and analysis of a group of developers.

2. The method as claimed in claim 1, wherein analyzing the profile attributes of the developer comprises at least one of:
    comparing profile attributes of the developer with profile attributes of one or more other developers; and
    determining a correlation between profile attributes and an aptitude for defined role descriptions.

3. The method as claimed in claim 1, further comprising at least one of:
    defining profile attributes to be determined;
    defining algorithms to generate the profile attributes from the gathered data relating to code repository updates;
    defining role descriptions including criteria of profile attributes that fit role descriptions; and
    defining comparison criteria for profile attributes of two or more developers.

4. The method as claimed in claim 1, wherein analyzing the gathered data to determine profile attributes of the developer to provide a behavior analysis of the developer is carried out over a predetermined time period or number of updates.

5. The method as claimed in claim 1, wherein profile attributes include at least one of: update code change size, percentage of conflicting code changes, a code change commit frequency, a range of working hours, a regularity of events, a comment regularity, a comment depth.

* * * * *